(12) United States Patent
Anderson

(10) Patent No.: US 6,396,965 B1
(45) Date of Patent: May 28, 2002

(54) TWISTING FIBER DEPOLARIZER

(75) Inventor: Duwayne R. Anderson, St. Helens, OR (US)

(73) Assignee: Tektronix, Inc., Beaverton, OR (US)

( * ) Notice: Subject to any disclaimer, the term of this patent is extended or adjusted under 35 U.S.C. 154(b) by 6 days.

(21) Appl. No.: 09/722,123

(22) Filed: Nov. 22, 2000

(51) Int. Cl.[7] ............................................. G02B 6/00
(52) U.S. Cl. ........................ 385/11; 385/123; 356/350
(58) Field of Search ........................ 385/11, 123, 27, 385/28, 29, 95, 97, 25

(56) References Cited

U.S. PATENT DOCUMENTS

| | | | | |
|---|---|---|---|---|
| 4,997,282 A | * | 3/1991 | Pavlath ........................ | 356/460 |
| 5,218,652 A | * | 6/1993 | Lutz ............................ | 385/11 |
| 5,245,407 A | * | 9/1993 | Nishiura et al. ............. | 356/460 |
| 5,337,375 A | * | 8/1994 | Nyman et al. ............... | 359/333 |
| 5,371,595 A | * | 12/1994 | Nishiura et al. ............. | 356/460 |
| 5,408,545 A | * | 4/1995 | Lee et al. .................... | 359/483 |
| 5,935,292 A | * | 8/1999 | Hernandez et al. .......... | 249/57 |
| 5,999,668 A | * | 12/1999 | Hernandez et al. .......... | 385/12 |

* cited by examiner

*Primary Examiner*—Robert H. Kim
*Assistant Examiner*—George Wang
(74) *Attorney, Agent, or Firm*—Francis I. Gray

(57) ABSTRACT

A twisting fiber depolarizer has sections of a birefringent (HiBi) fiber spliced to opposing ends of a nominally non-birefringent fiber, such as a single mode fiber, between a pair of hold points to produce a fiber assembly. Means is applied to the free portion of the fiber assembly between the hold points for twisting the free portion of the fiber assembly with a back and forth motion to depolarize an optical signal input to one end of the fiber assembly.

6 Claims, 2 Drawing Sheets

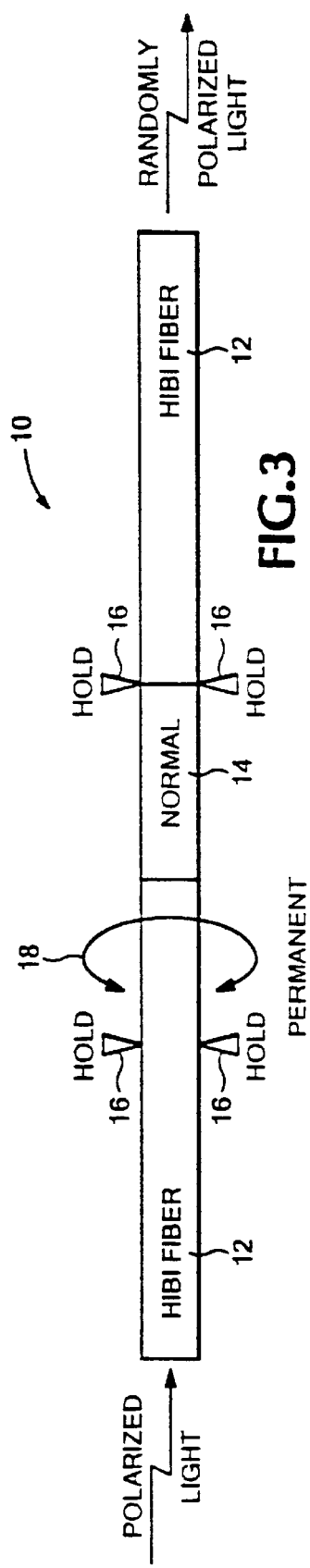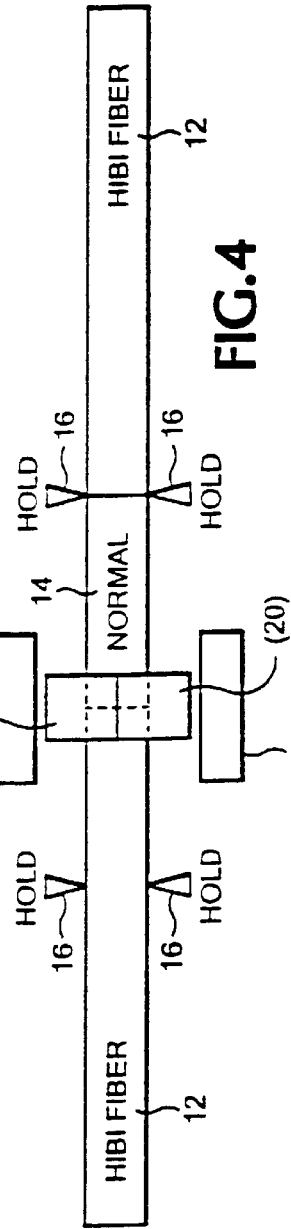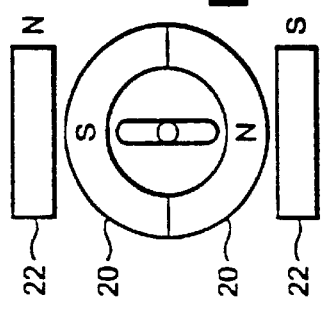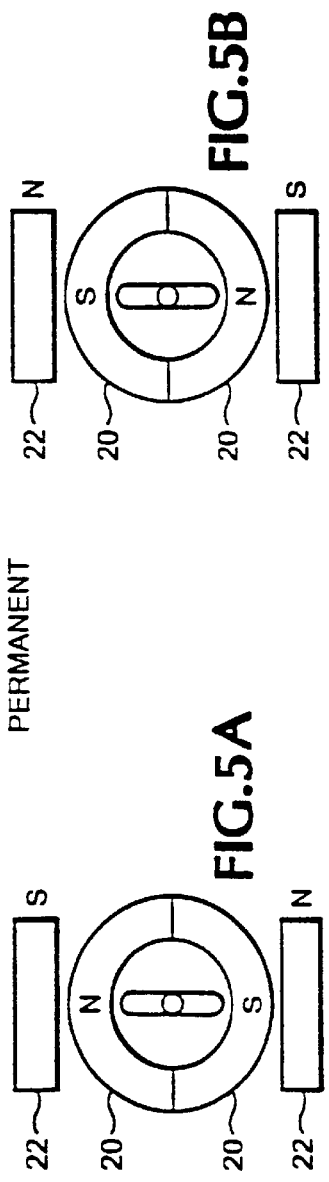

TWISTING FIBER DEPOLARIZER

BACKGROUND OF THE INVENTION

The present invention relates to optical measurement devices, and more particularly to a twisting fiber depolarizer for overcoming polarization-dependent loss (PDL) in optical components of such optical measurement devices.

Many optical components exhibit polarization-dependent loss (PDL). Dichroic polarizers, such as used in sunglasses, are one example. Other examples are optical circulators, couplers and diffraction gratings. The existence of PDL in optical test instruments results in errors in optical power measurements. The reason is that the state of polarization of light being tested is uncontrolled, i.e., may be in any state, yet the existence of PDL ensures that the optical power measured by such instruments as an optical power meter, optical time domain reflectometer (OTDR) or optical spectrum analyzer (OSA) is a function of the state of polarization. Therefore if the input state of polarization happens to be in one particular configuration, the instrument returns a different power measurement than if the input polarization is in a different state.

PDL in OTDRs results in waveform noise that cannot be averaged away and is both aesthetically distracting as well as disruptive to both automatic and manual measurements of waveform events. In one situation PDL of less than 0.1 dB resulted in very objectionable waveform degradation, which illustrates the severity of the problem with PDL even when present in seemingly trivial amounts. Strongly polarized light sources are especially common in wave division multiplexed (WDM) systems, and low PDL is a key specification touted by manufacturers of OSAs. The problem with OSAs may be especially acute since many dispersive components in OSAs exhibit high PDL, i.e., the diffraction efficiency of a diffraction grating may be roughly 80% for one state of polarization and 20% for the orthogonal state.

Because of the importance of low PDL and the difficulty associated with designing it out of optical components in an instrument, it is essential that the input state of polarization be scrambled, i.e., depolarized. The job of the depolarizer is to make sure that even if the light coming into the test equipment is 100% polarized, it is depolarized before entering the OTDR or OSA and going through any optical components with high PDL. For most purposes a depolarized state may be taken as one in which the transmission of the light through a linear polarizer is independent of the angular orientation of the polarizer. For example, if a person goes outside on a sunny day with a pair of polarized sunglasses and looks at the painted side of a building while rotating the glasses, a variation in the apparent brightness of the building is not observed. The paint of the building reflects unpolarized light. Looking at the sky and rotating the glasses, on the other hand, produces a change in the brightness of the sky in a cyclical manner since the sky is partially polarized. The same phenomenon is observed when looking through polarized sunglasses at light that's been reflected from a shiny surface.

A class of active depolarizers work by passing light through a time-varying birefringent medium. One such single path approach is to have two devices for introducing birefringence in an optical fiber. These devices may be piezoelectric transducers or electromagnetic devices. When the fiber is pinched by a first pincher, the stress causes the fiber to become birefringent, setting up a fast and slow axis in the cross-sectional plane of the optical fiber. A second pincher follows oriented 45 degrees relative to the first. If the stress applied by the pinchers varies with time, the state of polarization emanating from the fiber changes with time. Averaging over a sufficiently long period of time produces an apparent random state of polarization. Problems arise with accurate phase and amplitude control, minor variations of which may result in relatively poor polarization scrambling. Another problem is that the force exerted on the fiber by the pinchers may eventually damage the fiber.

Polarization-maintaining fiber, called HiBi fiber, has birefringence built into the fiber's core. Birefringence means that the fiber's core has an index of refraction that depends upon the light's state of polarization. Light polarized in the vertical direction, for example, "sees" a different index of refraction than light polarized in the horizontal direction. The difference in the index of refraction between these two eigenmodes is the birefringence. FIG. 1 shows an end view of an HiBi fiber having a core, a cladding and stress members. The stress members serve to establish birefringence in the optical fiber, resulting in orthogonal axes. Light polarized along a vertical eigenmode experiences a different index of refraction than light polarized along a horizontal eigenmode, as discussed above. HiBi fiber has the property that, once polarized light is injected into the fiber, the state of polarization with respect to the two eigenmodes is maintained. In other words as the eigenmodes are rotated by twisting a chunk of HiBi fiber, the polarized light in the fiber twists right along with it, as shown in FIG. 2. The round circles with orthogonal black lines represent the two eigenmodes of the HiBi fiber. The line with the arrows at each end represents the state of polarization of the light within the fiber which rotates along with the twisting of the HiBi fiber.

What is desired is a simple fiber depolarizer to minimize the effect of PDL in optical components.

BRIEF SUMMARY OF THE INVENTION

Accordingly the present invention provides a twisting fiber depolarizer having a fiber assembly of a nominally non-birefringent fiber spliced between two birefringent (HiBi) fibers, with the HiBi fibers held rigidly at two points—one point being one of the splice points and the other point being a point on the HiBi fiber on the opposite side of the other splice point. A torsion is applied to the free portion of the fiber assembly between the hold points using a back and forth motion. The twisting of the free portion of the fiber assembly over a time interval serves to randomize the polarization of light applied to one end of the fiber assembly when it appears at the other end.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is an illustrative view of a twisting fiber depolarizer according to the present invention.

FIG. 4 is an illustrative view of the twisting fiber depolarizer of FIG. 3 including a twisting mechanism according to the present invention.

FIGS. 5A and 5B illustrate the torsion applied to the twisting depolarizer by the twisting mechanism of FIG. 4.

DETAILED DESCRIPTION OF THE INVENTION

Figure 1:
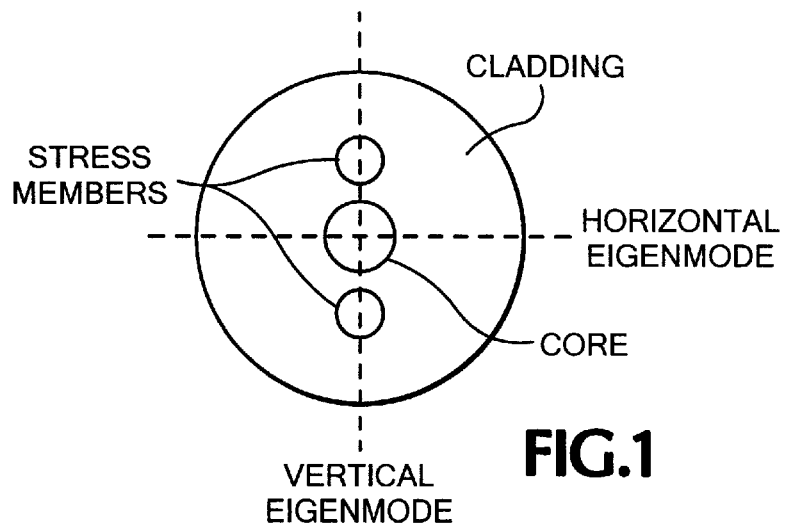
FIG. 1 is an end view of a highly birefringent (HiBi) fiber.
Figure 2:
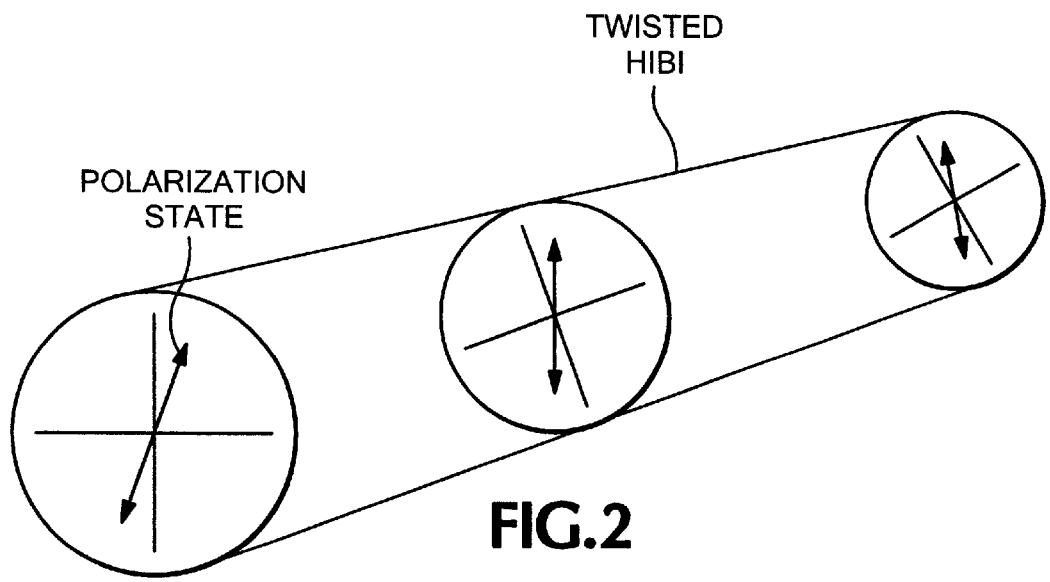
FIG. 2 is an illustrative view of the effect of twisting HiBi fiber upon the polarization of light injected therein.

Referring now to FIG. 3 an active depolarizer 10 is shown having a nominally non-birefringent fiber 14, such as a single-mode fiber, spliced between two birefringent (HiBi) fibers 12, i.e., fibers that maintain polarization. This assembly is held at a pair of hold points 16, one hold point being at one splice and the other hold point being at a point on the HiBi fiber on the opposite side of the other splice point. A twisting or back and forth motion is applied to the free portion of the fiber assembly between the hold points 16 as shown by the arrow 18. The hold points 16 are sufficiently far apart to avoid high stress that would damage the fiber. If the free portion of the fiber assembly is twisted at a high enough frequency, the state of polarization averaged over a sufficiently long period of time appears to be random. Both the amount of rotation and the rate of rotation are important, along with the period, in ensuring complete depolarization. Five to ten cycles of oscillation are preferred within the period, so for a period of one second the frequency may be between 5–10 Hz and for a period of one millisecond the frequency may be between 5–10 kHz. The optimum amount of rotation is one hundred eighty degrees.

The fiber may be rotated in several ways. One way, shown in FIGS. 4 and 5, is to mount a magnet 20 directly to the fiber assembly between the holding points 16 and place the assembly in an oscillating electrical field by electromagnets 22. The fiber/magnet/field assembly then constitutes an electromechanical resonator. Another method is to thread the depolarizer 10 through the center axis of an electrical motor and then drive the motor through the appropriate angular pattern. Yet another approach is to attach the polarizer to a resonating coil or other mechanism such as a galvanometer that rapidly oscillates back and forth. However it is done, the key point is to splice two pieces of HiBi fiber to opposing ends of a non-birefringent piece of normal single-mode fiber and then twist the fiber assembly as shown at a rate much higher than the receiver bandwidth of an optical measurement device, such as an OTDR or OSA.

The depolarizer works by twisting the relative state of polarization between the two highly birefringent (HiBi) fibers 12. These two fibers are joined together by fusion splices to a short length (about two centimeters) of nominally non-birefringent (single-mode) fiber 14. At one of these fusion splices the fiber assembly is secured (16) so that it cannot move, which may be accomplished by a blob of epoxy or the like. Then straddling the other splice a miniature magnet 20 is slipped over and bonded to the fiber assembly and bonded to the fiber. This magnet 20 is such that one side is N-polarized and the other side is S-polarized. The fiber assembly is stretched tight and held (16) slightly behind the magnet 20, again with something like epoxy. Above and below the fiber assembly are mounted two electromagnets 22. The whole arrangement constitutes a torsional system with a natural frequency of $f_n=\sqrt{(k/I)}$ where k is the torsional stiffness and I is the total moment of inertia of the system, including both the fiber assembly and the magnet. The torsional stiffness is defined as $k=(d\tau/d\theta)$ where $d\tau$ is the differential torque required to rotate the system by $d\theta$. The torsional stiffness of the fiber assembly is given by $k=(J*G)/L$ where L is the length of the fiber assembly between the two holding supports 16, J is the polar moment of inertia of the fiber and G is the modulus of rigidity of the glass fiber 14. For example if the fiber-mounted magnet is 5 mm long and 1.5 mm in diameter, and if the free portion of the fiber assembly (the part that twists) is 2.5 cm long, then the natural frequency is about 1.165 kHz and the maximum strain in the twisting fiber assembly is 0.65%. Since this is a pretty high strain and the fiber assembly may not stand up to repeated twisting under these conditions, the free portion of the fiber assembly may be made longer, which reduces the resonant frequency. This system should be driven at the resonant frequency to reduce the amount of required electrical energy.

Operationally consider an optical component with ultimate PDL: a linear polarizer with infinite extinction ratio. Impinge light of arbitrary polarization upon the polarizer. Depending upon the light's state of polarization, transmission efficiency through the polarizer varies between 0 and 1. Now place the twisting fiber depolarizer 10 between the input state of polarization and the linear polarizer. Average the power transmitted through the polarizer over one period of angular rotation. The average power through the polarizer is 0.5, regardless of the input state of polarization.

It should be noted that the depolarizer may actually be used to measure PDL if it changes the state of polarization slower than the bandwidth of an optical power meter in a test system. If it changes the state of polarization very fast, it makes the light look as if it is not polarized. If it changes the state of polarization slowly, it makes it possible to track the change in transmission versus input state of polarization, which leads directly to a measurement of PDL.

Thus the present invention provides a twisting fiber depolarizer for overcoming the PDL of optical components in an optical measurement device by splicing birefringent (HiBi) fibers to opposing ends of a nominally non-birefringent (single mode) fiber, and then twisting the fiber assembly in a back and forth motion to depolarize an input optical signal to the depolarizer.

What is claimed is:

1. A twisting fiber depolarizer comprising:

a fiber assembly having a nominally non-birefringent fiber spliced between two highly birefringent fibers;

means for rigidly holding the fiber assembly at two points on the fiber assembly, one point being one of the splice points and the other point being on the other side of the other splice point, so as to have a free portion of the fiber assembly between the two points;

means for twisting the free portion of the fiber assembly in a back and forth motion.

2. The twisting fiber depolarizer as recited in claim 1 wherein the twisting means comprises:

a magnet rigidly mounted on the fiber assembly at the other splice point; and means for applying an oscillating electric field to the magnet so that the free portion of the fiber assembly twists between the hold points.

3. The twisting fiber depolarizer as recited in claim 1 wherein the twisting means comprises:

an electrical motor, the fiber assembly between the hold points being threaded through the electric motor; and means for driving the electrical motor through an appropriate angular pattern to twist the fiber assembly in the back and forth motion between the hold points.

4. The twisting fiber depolarizer as recited in claim 1 wherein the twisting means comprises:

a resonating coil attached to the fiber assembly between the hold points; and means for driving the resonating coil so that it oscillates with the back and forth motion.

5. The twisting fiber depolarizer as recited in claim 1 wherein the twisting means causes the fiber assembly between the hold points to twist back and forth at a rate much higher than a receiver bandwidth of an optical measurement device.

6. The twisting fiber depolarizer as recited in claim 1 wherein the frequency of the twisting means comprises the resonant frequency of the free portion of the fiber assembly.

* * * * *